March 7, 1939. C. F. BLOOD, JR 2,149,660
LIQUID DISTRIBUTING APPARATUS
Filed May 7, 1937
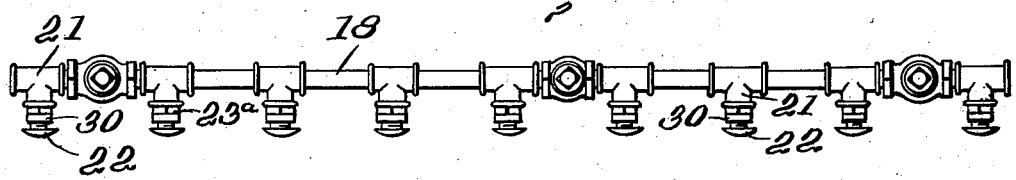
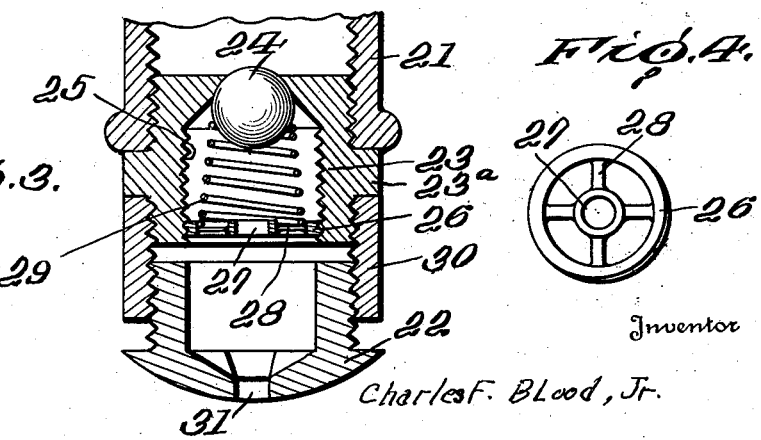
Inventor
Charles F. Blood, Jr.
By Mason & Porter
Attorneys Patented Mar. 7, 1939

2,149,660

UNITED STATES PATENT OFFICE 2,149,660

LIQUID DISTRIBUTING APPARATUS

Charles F. Blood, Jr., Springfield, Mass., assignor of one-half to Charles P. Price, Natick, Mass.

Application May 7, 1937, Serial No. 141,348

2 Claims. (Cl. 299—34)

The present invention relates to new and useful improvements in an apparatus for distributing liquids, and more particularly to improvements in an apparatus for distributing or spraying liquids, such as oil, liquid tar or the like, onto road surfaces.

An object of the present invention is to provide an apparatus of the above type which positively prevents the dripping or draining of any of the liquid onto the road surface after the supply is shut off.

A further object of the invention is to provide an apparatus of the above type wherein a valve for controlling the flow of liquid from the supply is located in the discharge line remote from the outlet therefrom, and wherein means are provided at the outlet end of the discharge line for automatically preventing dripping or draining of liquid which remains in the discharge line when the control valve is closed.

The above and other objects of the invention will in part be obvious and will be hereinafter more fully pointed out.

In the accompanying drawing:

Fig. 1 is a fragmentary side elevation showing one form of a liquid distributing apparatus.

Fig. 2 is a side view showing the arrangement of the distributing or spraying nozzles at the outlet end of the discharge line Fig. 3 is an enlarged view in section, showing one of the distributing or spraying nozzles and the valve means associated therewith for preventing dripping or draining of the liquid after the supply is cut off.

Fig. 4 is a plan view of the spring supporting member.

The invention contemplates generally the provision of an apparatus for distributing or spraying liquids, such as may be used for applying oil, liquid tar or the like, onto road surfaces. The apparatus consists of a supply means for the treating liquid and of a discharge line communicating with the supply tank and with one or more nozzles at the outlet end thereof. A valve for controlling the flow of liquid from the supply tank into the discharge line is located in the discharge line remote from the outlet end therefrom. The liquid discharged from the supply tank is preferably under pressure. The nozzle or nozzles at the outlet end of the discharge line are controlled by spring valve means which tend to normally shut off communication between the nozzles and the discharge line. Thus, when the main control valve is opened, the pressure of the liquid in the discharge line will serve to open the spring valve means in the nozzles so as to permit the liquid to be distributed and sprayed over the road surface. Heretofore, when the main control valve was closed, the liquid remaining in the discharge line between the control valve and the spray nozzles drained slowly through the nozzles so as to drip on the road surface after the supply was cut off. According to the present invention, however, when the main control valve is closed, the pressure in the discharge line is thus immediately relieved so that the spring valve means in each of the nozzles automatically shuts off communication between the nozzles and the discharge line so as to positively prevent dripping or draining of the liquid onto the road surface.

Referring more in detail to the accompanying drawing, there is shown for purposes of illustration, a spraying or distributing apparatus of the type shown and described in the patent to Charles P. Price, No. 1,320,273, granted October 28, 1919. In this form of apparatus, there is a supply tank 10 carried by a framework 11 which is supported on wheels 12. Mounted on the framework 11 is a depending frame 13 in which are threaded a pair of shafts 14 which carry hand wheels 15. The lower ends of the shafts 14 are secured to a trackway 16 in which a pair of brackets 17 are mounted. The brackets 17 are fixedly secured to the distributor pipe 18. Connected to the distributor pipe 18 is a flexible discharge line 19 which is controlled by a valve 20 for controlling the flow of fluid from the supply tank into the discharge line. The apparatus, thus far described, is substantially the same as that shown in the aforementioned patent, so that no further description thereof is considered necessary.

A plurality of outlet or discharge pipes 21 are connected to the distributor pipe 18. Each of the outlet pipes 21 is provided with a nozzle 22 for directing the liquid onto the road surface. Inasmuch as the construction of each of the nozzles is identical, a description of one will be sufficient. Referring to Fig. 3, the outlet pipe 21 is internally threaded to receive a valve casing 23 which is provided with an opening therethrough controlled by a ball 24. The valve body is internally threaded as at 25 around the opening therethrough. A supporting plate 26 is adapted to threadedly engage the internal threads 25 on the valve body 23. This plate includes a central ring or hub portion 27 which is connected to the outside thereof by spokes 28. A coil spring 29 is disposed within the valve body 23 and bears against the ball 24 and also against the spokes 28 on the supporting plate 26. A coupling member 30 is internally threaded to engage the external threads on the valve body 23 and to receive the nozzle 22 which is provided with a slot 31 through which the liquid flows. The valve body 23 is provided with an annular hexagonal shoulder 23a which provides a wrench hold for tightening the valve body and also serves as a stop against which the outlet pipe 21 and the coupling 30 abut.

The liquid in the supply tank 10 is preferably under pressure and the valve 20 in the discharge line controls the passage of the liquid from the tank through the flexible discharge line 19 to the distributor pipe 18. The valve 20 is thus located above and remote from the nozzles 22 in the distributor pipe. The springs 29 in each of the nozzles controlling the ball valves 24 may be adjusted uniformly so that all of the ball valves will open in unison, thus assuring a uniform distribution of the liquid through the nozzles 22. The adjustability of the ball check valves 24 in each of the nozzles also serves as a means for preventing the passage of liquid through the nozzles until a predetermined pressure has been reached in the discharge line.

In operation, when the valve 20 is opened, liquid under pressure will flow from the tank 10 through the flexible discharge line 19 into the distributor pipe 18 and will cause the opening of the ball check valves 24 in unison so that the liquid will simultaneously issue from the several nozzles 22 onto the road surface. When the apparatus has reached an area which is not to be sprayed with the treating liquid, the valve 20 may be closed so as to shut off the supply of liquid from the tank 10. The closing of the valve 20 immediately relieves pressure in the discharge line 19 so that the springs 29 will instantly effect a closing of the ball check valves 24 so as to prevent the dripping or draining of liquid which remains in the discharge line 19. According to the present invention, therefore, there is thus provided an apparatus wherein a main control valve is utilized for shutting off the supply of treating liquid, and wherein the check valves in each of the nozzles will automatically cut off the flow of liquid through the nozzles so that no dripping will occur over areas which are not to be treated. The check valves in each of the nozzles thus are opened against the action of the springs 29 by the liquid pressure in the discharge line, and are closed by the action of the springs 29 when the pressure in the discharge line has fallen below a predetermined amount, depending upon the adjustment of the springs. Adjustment of the tension on the springs 29 may be effected by adjusting the position of the supporting plate 26 in the valve body 23. This adjustment is desirable for various pressures in the discharge line and also for assuring the opening and closing of the spring valves in unison.

It is to be clearly understood that minor changes in the details of construction and arrangement of parts may be made without departing from the scope of the invention as set forth in the appended claims.

I claim:

1. An oil distributing apparatus, including in combination, a source of supply for the oil, a distributor pipe for receiving the oil, conduit means connecting the source of supply with said distributor pipe, a main control valve for controlling the flow of oil from the source of supply to said distributor pipe, a plurality of downwardly directed discharge pipes communicating with said distributor pipe and depending therefrom, a nozzle associated with each of said discharge pipes for spraying the oil issuing therefrom, means providing a valve seat within each of said discharge pipes, a valve adapted for cooperation with each of said valve seats and disposed between the valve seat and said nozzle, spring means associated with each of said discharge pipes for normally forcing said valve upwardly into contact with said valve seat for closing communication between the discharge pipes and the nozzles when the main control valve is closed whereby to prevent dripping of oil remaining in the distributor pipe, and means disposed between each of said nozzles and each of said valves for adjusting the tension of each of said spring means whereby to effect a uniform distribution of the oil from said nozzles and to determine a predetermined pressure in said distributor pipe at which said valves will open.

2. An oil distributing apparatus including, in combination, a source of supply for the oil, a distributor pipe for receiving the oil, conduit means connecting the source of supply with said distributor pipe, a main control valve located in said conduit means for controlling the flow of oil from the source of supply to said distributor pipe, a plurality of downwardly directed discharge pipes communicating with said distributor pipe and depending therefrom, a valve casing secured to the open end of each of said discharge pipes and including a valve seat through which the oil may pass, a depending nozzle secured to each of said valve casings for spraying the oil issuing therefrom, a valve associated with each of said valve casings and disposed between the valve seat and said nozzle, an apertured supporting plate adjustably mounted in each of said valve casings between the valve seat and said nozzle, and a spring disposed within each of said valve casings and abutting against the valve and said supporting plate for normally forcing said valve upwardly into contact with the valve seat for closing communication between the discharge pipes and the nozzles when the main control valve is closed whereby to prevent dripping of oil remaining in the distributor pipe, said adjustable supporting plate providing for the adjustment of each of said springs whereby to effect a uniform distribution of the oil from said nozzles and to determine a predetermined pressure in said distributor pipe at which said valves will open.

CHARLES F. BLOOD, Jr.